United States Patent [19]

Mikami et al.

[11] Patent Number: 5,704,031

[45] Date of Patent: Dec. 30, 1997

[54] METHOD OF PERFORMING SELF-DIAGNOSING HARDWARE, SOFTWARE AND FIRMWARE AT A CLIENT NODE IN A CLIENT/SERVER SYSTEM

[75] Inventors: Ichizou Mikami, Suita; Toshio Komasaka, Tokushima; Masahiro Niimi, Tokushima; Takashi Miyamoto, Tokushima, all of Japan

[73] Assignee: Fujitsu Limited, Kawasaki, Japan

[21] Appl. No.: 569,945

[22] Filed: Dec. 8, 1995

[30] Foreign Application Priority Data

Mar. 30, 1995 [JP] Japan .................................. 7-074118

[51] Int. Cl.$^6$ ...................................................... G06F 11/00
[52] U.S. Cl. ........................... 395/182.02; 395/200.03; 395/200.11
[58] Field of Search ..................... 395/182.02, 182.04, 395/182.05, 182.06, 182.11, 182.13, 182.22, 651, 653, 200.02, 200.03, 200.05, 200.1, 200.11

[56] References Cited

U.S. PATENT DOCUMENTS

| | | | |
|---|---|---|---|
| 5,129,080 | 7/1992 | Smith | 395/182.02 |
| 5,261,085 | 11/1993 | Lamport | 395/182.02 |
| 5,307,354 | 4/1994 | Cramer et al. | 395/182.02 |
| 5,513,314 | 4/1996 | Kandasamy et al. | 395/182.04 |
| 5,586,250 | 12/1996 | Carbonneau et al. | 395/183.2 |

*Primary Examiner*—William M. Treat
*Assistant Examiner*—Viet Vu
*Attorney, Agent, or Firm*—Staas & Halsey

[57] ABSTRACT

Each client unit 2 diagnoses its operation environment (hardware, software, firmware and so on) at the start time of itself, and when an abnormality or any change (deletion, modification or creation) has occurred and it is repairable, the client unit 2 itself repairs itself or maintenance process is conducted by reinstallation from the server unit 1. When it is unrepairable, the client unit 2 releases itself from the LAN line 100. In this way, by having the client unit 2 be provided with self maintenance capability to allow each client unit 2 to conduct the self maintenance of itself such a client/server system is realized by which loads of the server unit 1 and the LAN line 100 are reduced as well as the probability of system down occurrence is lowered, further the capability of the entire system is improved and a maintenance engineer or a user is not required much labor.

3 Claims, 6 Drawing Sheets

FIG. 6

| CONTENTS OF TROUBLE | CAUSE | BEFORE APPLICATION (5 YEARS) | AFTER APPLICATION (ONE YEAR) |
|---|---|---|---|
| IMPROPER IPL LACK OF MEMORY IMPROPER START OF SW JAPANESE DICTIONARY | UPDATE OF FILE DELETION OF FILE ADDITION OF FILE | 51 | 0 |
| LACK OF DISK ABNORMAL COMMUNICATION | UPDATE OF SETUP INFORMATION | 30 | 0 |
| ABNORMAL OPERATION, etc | MISTAKE IN CREATION OF BATCH FILE | 1 | 1 |
| SUM | | 82 | 1 |

METHOD OF PERFORMING SELF-DIAGNOSING HARDWARE, SOFTWARE AND FIRMWARE AT A CLIENT NODE IN A CLIENT/SERVER SYSTEM

BACKGROUND OF THE INVENTION

1. Field of the Invention

The present invention relates to a client/server system and more particularly to a client/server system, wherein each client automatically maintains itself on the initiative of the client.

2. Description of the Related Art

In recent years, client/server systems have become widespread as personal computers are improved in performance. The maintenance of each client in a conventional client/server system is generally performed in a so-called top-down method, wherein information necessary for maintenance has been stored in a server by a user, and instructions for maintenance are offered from the server. However, since the instructions for maintenance are basically offered simultaneously to all the clients connected to the server in this kind of top-down method, excessive loads are applied to the server and transmission lines each time maintenance is performed. In addition, since all the clients are made non-operational simultaneously while maintenance is performed, the capability of the entire system is reduced.

Furthermore, when an operation error by the user or a careless environment setting error leads to a problem which affects the entire network system, no instruction for maintenance can be offered from the server to the clients. In this case, maintenance cannot be performed until the problem is solved, and there is a fear of system down. Such a fear becomes significant as the number of the clients connected to the server increases. As a network system becomes larger, economical losses due to system down cannot be neglected.

Moreover, in these days, computer virus infections have become a problem in such a client/server system, wherein a plurality of personal computers are used as clients and servers. More particularly, when a computer virus invades one of personal computer used for a plurality of clients of a client/server system, the virus infects all the clients and servers via the network system, thereby causing serious losses.

For these reasons, the conventional client/server system requires maintenance. In addition, the time necessary for maintenance was greatly dependent on the maintenance capability of the server or the communication capability of the transmission line. Besides, when a problem has occurred, inquiries into the cause of the problem were dependent on the capability of the user or maintenance engineer. In practice, therefore, the system want not able to be recovered promptly as a matter of course, and the user and maintenance engineer were puzzled about the situation.

SUMMARY OF THE INVENTION

Accordingly, an object of the present invention is, plainly speaking, to provide a client/server system, wherein loads to the server and transmission line are reduced, the probability of system down occurrence is lowered and the capability of the entire system is improved by offering a self-maintenance capability to clients to allow each client to maintain itself.

In addition, when any difference is found as a result of diagnosing the conditions of the software and firmware in the operation environment of each client, the invention is intended to provide a client/server system which can perform system management so that the same software and firmware can be installed for all the clients.

A first aspect of the client/server system of the present invention comprises means in each client for diagnosing its operation environment (hardware, software, firmware, etc.) by itself at the start time of itself, and means for maintaining by repairing itself when any change has occurred in the software and firmware and when such a change is repairable or by reinstalling from the server, and for releasing the client from the network when such a change is not repairable.

Additionally, in a second aspect of the client/server system of the invention, each client comprises self-maintaining means for diagnosing the presence or absence of any change in the operation environment of the client, that is, any abnormality in hardware, or any deletion, creation or modification in the software and firmware, and the server comprises error information keeping means for keeping the state of a change when the self-maintaining means of a client has diagnosed that the change has occurred in the operation environment (hardware, software, firmware, etc.) of the client. A management unit of the invention comprises operation state collecting means for collecting the contents of the error information keeping means of the server, means for loading updated software and firmware into the server as backup data for the client by using operation environment update diagnosing means on the basis of the information collected by the operation state data collecting means when the software and firmware in the operation environment of the management unit have been updated, means for generating a procedure for installing the backup data loaded into the server in this way into the clients and for registering the procedure into the server, and means for generating an operation environment update procedure for updating the software and firmware in the operation environment of each client so that the software and firmware of each client coincide with those of the management unit and for registering the procedure into the server.

Moreover, a third aspect of the client/server system of the invention has the characteristics of the above-mentioned first and second aspects.

In the first aspect of the client/server system of the present invention, each client diagnoses its operation environment (hardware, software, firmware, etc.) at the start time thereof, and the client repairs itself when any abnormality or change has occurred in the operation environment and when such an abnormality or change is repairable or maintenance is performed by reinstallation from the server, or the client is released from the network when such an abnormality or change is not repairable.

Furthermore, in the second aspect of the client/server system of the present invention, each client conducts diagnoses any abnormality or change in its operation environment, the result of the diagnosis is kept by the error information keeping means of the server, the contents of the error information keeping means of the server are collected by the management unit. When the operation environment of the management unit is updated on the basis of the collected information, the updated contents are diagnosed by operation environment update diagnosing means. According to the update information, the backup data of the server is updated. The procedure for installing the backup data stored in the server into the clients is generated and registered in the server. Still more, the procedure which updates the software and firmware of the clients so that they have a state obtained when the same software and firmware as those of the management unit were installed is generated and registered in the server.

Moreover, in the third aspect of the client/server system of the present invention, at the start of each client, the client diagnosing any change in its operation environment, that is, any abnormality in hardware, or any deletion, creation or modification in the software and firmware, and the client repair itself when the change has occurred and when it is repairable, or maintenance is performed by reinstallation from the server, or the client is released from the network when the change is not repairable. Still more, in the management unit, any change in the software of each client is diagnosed, the result of the diagnosis is kept by the error information keeping means of the server, the contents of the error information keeping means of the server are collected by the management unit. When the operation environment of the management unit is updated on the basis of the collected information, the updated contents are diagnosed by operation environment update diagnosing means. According to the updated information, the backup data of the server is updated. The procedure for installing the backup data stored in the server into the clients is generated and registered in the server. Still more, the procedure which updates the software and firmware of the clients so that they have a state obtained when the same software and firmware as those of the management unit were installed is generated and registered in the server.

The above and further objects and features of the invention will more fully be apparent from the following detailed description with accompanying drawings.

BRIEF DESCRIPTION OF THE DRAWINGS

FIG. 6 is a table showing actual results obtained by the trial operation of the client/server system of the invention.

DESCRIPTION OF THE PREFERRED EMBODIMENTS

The present invention will be detailed below referring to the accompanying drawings showing embodiments thereof.

Figure 1:
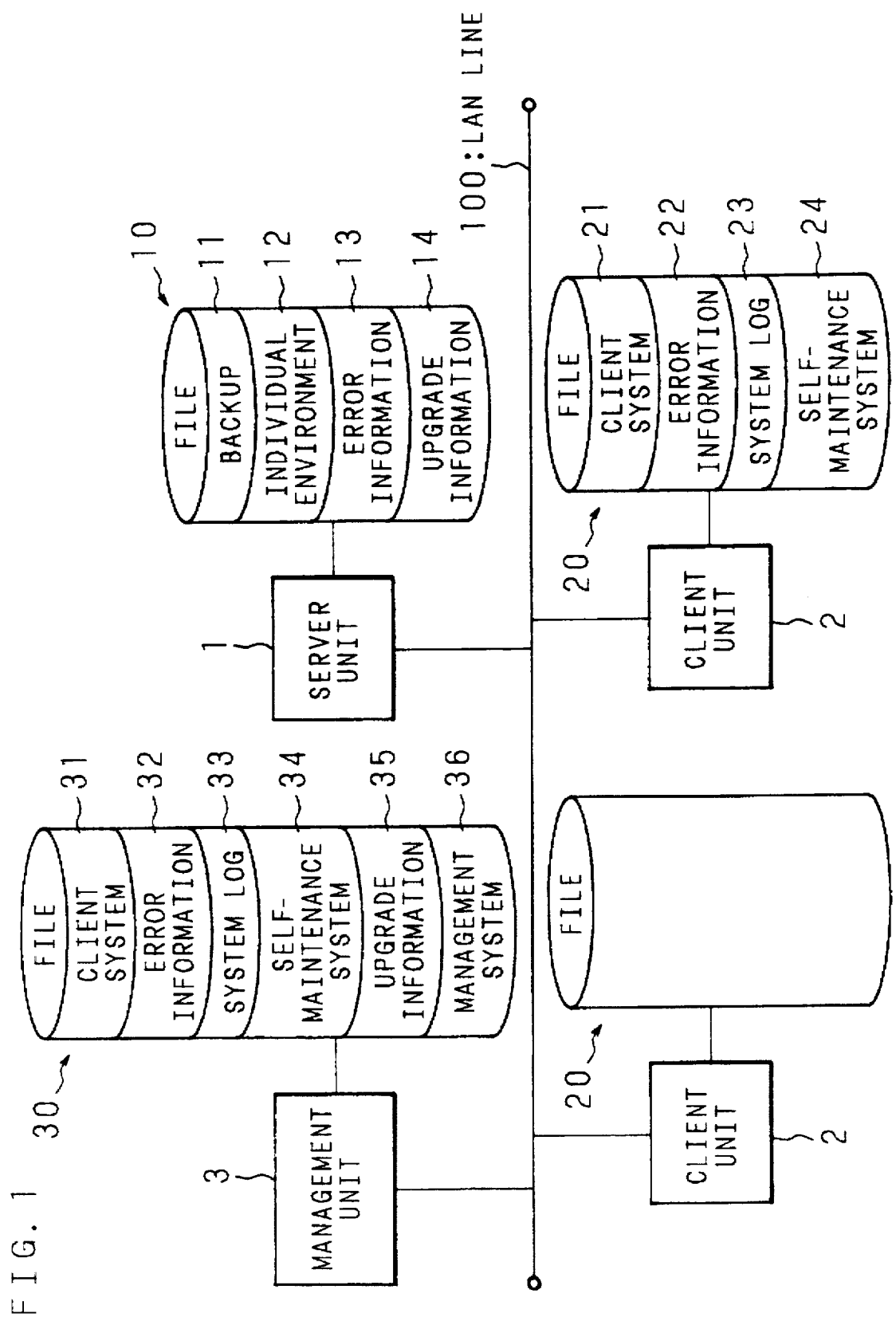
FIG. 1 is a schematic diagram showing an example of the entire configuration of a client/server system of the present invention.

FIG. 1 is a schematic diagram showing an example of the entire configuration of a client/server system of the present invention;

In FIG. 1, reference numeral 100 designates a LAN line, and reference numerals 1, 2 and 3 designate a server unit, a client unit and a management unit respectively. All of these are connected to the LAN line 100. Although a plurality of server units 1 and a plurality of client units 2 can be connected to one LAN line 100, one server unit 1 and two client units 2 are connected in this example. In addition, although one management unit 3 is desired to be connected to the entire client/server system, one of a plurality of client units 2 can be also used as one management unit 3.

The server unit 1, the client unit 2 and the management unit 3 are utilized by ordinary personal computers, and in terms of hardware, each comprises a CPU, a memory, disk units (hard disk, flexible disk, etc.), a printer, a display, an interface with the LAN line 100 and the like, and firmware has been installed in them. Furthermore, large storage media 10, 20 and 30 using hardware such as hard disks, magnetic tapes and so on are connected to each unit, and software is installed in them.

Filed information, such as a backup file 11 of the clients, an individual environment file 12 of the clients, an error information file 13 and an upgrade information file 14 and the like, has been stored in the storage medium 10 of the server unit 1. Data for backing up files of a client system common to all client units 2 is stored in the backup file 11. Data for stacking up files of a client system required for each client unit 2 is stored in the individual environment file 12. Abnormality information regarding the operation environment of each client unit 2 is stored in the error information file 13. Renewal information on the operation environment of each client unit 2, that is, data for specifying the version of each client system, is stored in the upgrade information file 14.

Filed information, such as a client system file 21, an error information file 22, a system log file 23 and a self-maintenance system file 24, has been stored in the storage medium 20 of the client unit 2. Various softwares required for the client unit 2 are stored in the client system file 21. Abnormality information on the operation environment of the client unit 2 is stored in the error information file 22. The operation environment data of the client unit 2 is stored in the system log file 23. Software for self-maintenance of each client unit 2, being characteristic of the present invention, is stored in the self-maintenance system file 24.

Filed information, such as a client system file 31, an error information file 32, a system log file 33, a self-maintenance file 34, an upgrade information file 35 and a management system file 36, is stored in the storage medium 30 of the management unit 3. Since the management unit 3 can also be used as a client unit 2 as described above, the client system file 31, the error information file 32, the system log file 33 and the self-maintenance system file 34 are virtually same as the client system file 21, the error information file 22, the system log file 23 and the self-maintenance system file 24 of the client unit 2 described above, respectively. The operation environment update information of each client unit 2 is stored in the upgrade information file 35. A software for managing the entire system is stored in the management system file 36.

Figure 2:
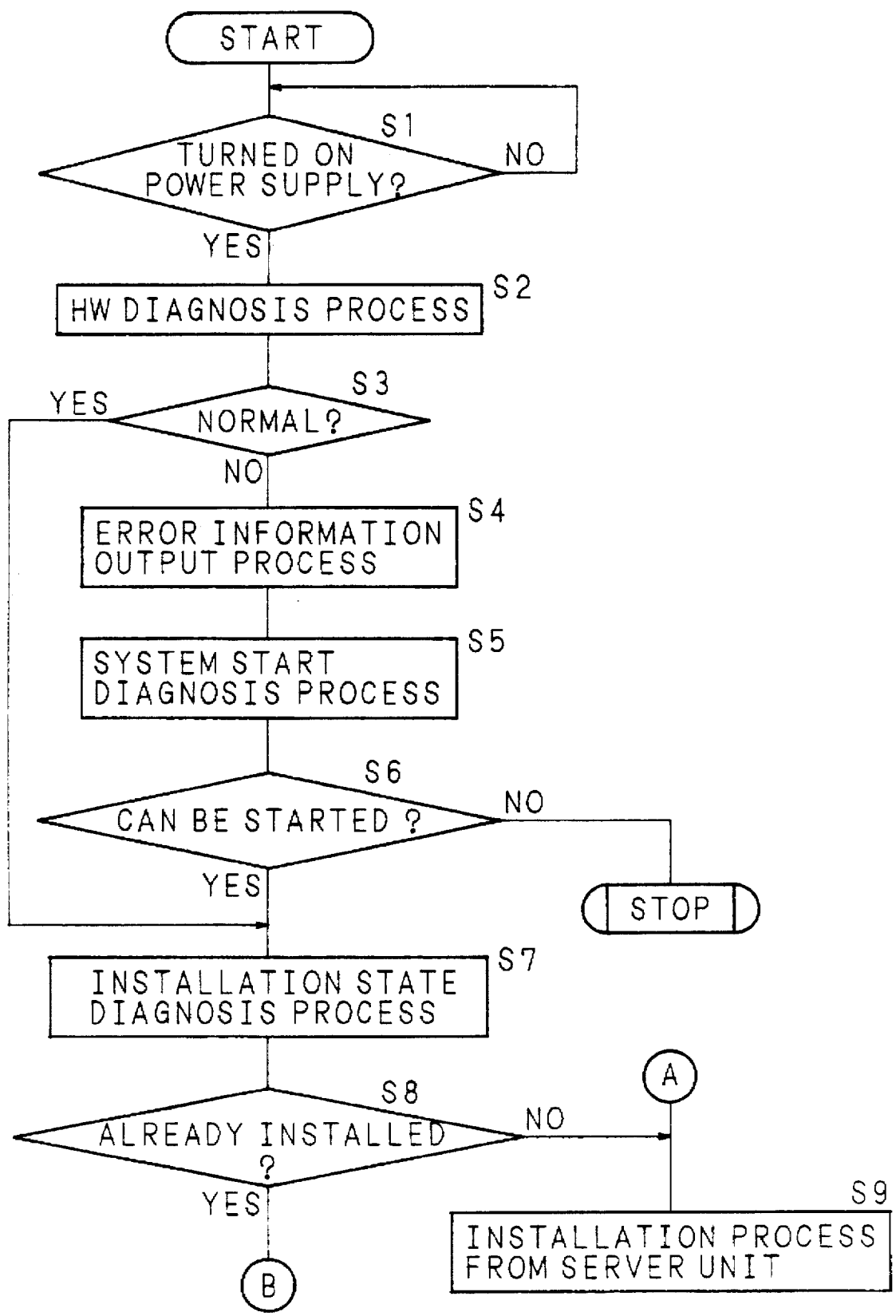
FIG. 2 is a part of a flow chart showing a processing procedure using software for self-maintenance by a client unit of the client/server system of the invention.
Figure 3:
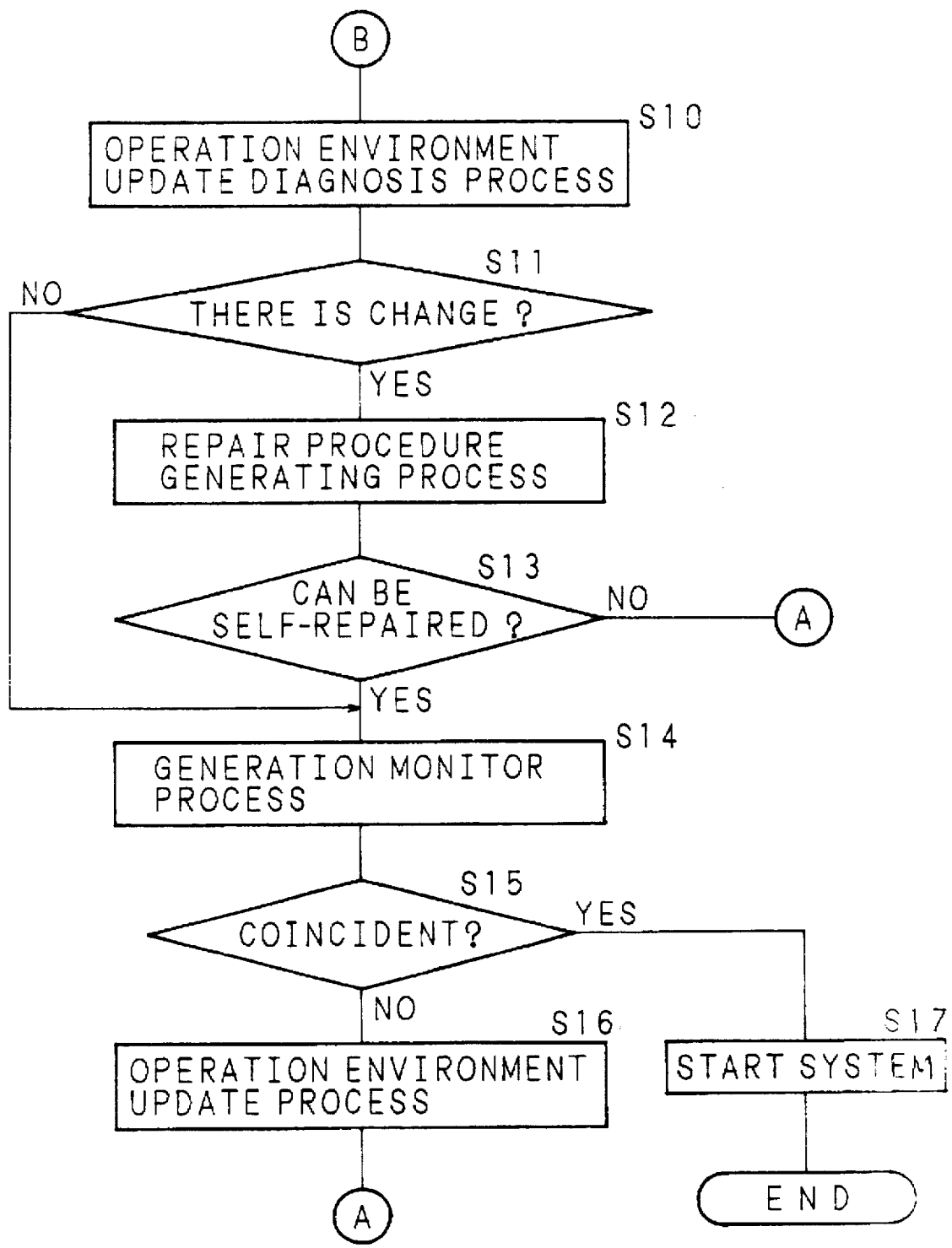
FIG. 3 is another part of the flow chart showing the processing procedure using software for self-maintenance by a client unit of the client/server system of the invention.

In the operation of the client/server system of the invention, the processing procedure using software for self-maintenance stored in the self-maintenance system file 24 of each client unit 2 is first described below referring to the flow charts shown in FIG. 2 and FIG. 3.

When the power supply of one client unit 2 is turned on (step S1), the software for performing self-maintenance stored in the self-maintenance system file 24 of the client unit 2 is started.

At first, a hardware diagnosis process is performed (step S2). More specifically, various hardwares constituting the client unit 2, such as a CPU, a memory, disk units (hard disk, flexible disk, etc.), a printer, a display and an interfere with the LAN line 100 and the like are diagnosed to check whether they are normal or not (step S3).

When an abnormality is found in the hardware of the client unit 2, the hardwares are discriminated into usable and unusable hardwares. Error information for notifying which hardware caused what kind of abnormality is then stored temporarily in the error information file 22 of the client unit 2 (error information output process: step S4). The contents of the error information file 22 of the client unit 2 are outputted to the LAN line 100 at appropriate timing and are also stored in the error information file 13 of the server unit 1.

When an abnormality is found in the hardware of the client unit 2, a system start diagnosis process is performed to check whether the software stored in the client system file 21 can be started or not in the abnormal condition (step S5). When the client system cannot be started at all because of the abnormality in the hardware, only the client unit 2 is set in the stop state (step S6).

Next, an installation state diagnosis process is performed (step S7). More specifically, the installation state of the client system file 21 of the client unit 2 is diagnosed (step S8). When the installation has not been completed, the installation process (step S9) is performed. The installation process is a process for installing the software required by the client unit 2 in the client system file 21 of the client unit 2. The software is installed from the backup file 11 of the server unit 1 or, in some cases, from the individual environment file 12, to the client system file 21 of the client unit 2 (step S9).

Then, an operation environment change diagnosis process is performed (step S10). More specifically, the presence or absence of any change in the system environment of the client unit 2, that is, any change in the software and firmware is checked through diagnosis by comparing the contents of the system log file 23 with the contents of the client system file 21. When any change is found in the file as the result of the diagnosis (step S11), a repair procedure generating process is performed (step S12). However, since the basic software of the system, such as the operating system (OS), cannot be repaired easily (step S13), a reinstallation process is performed from the backup file 11 of the server unit 1 when the basic software has been changed (step S9). Software which can be self-repaired, such as application software, is self-repaired by each client unit 2. At the time of this self-repair, unuseful files or the like created by user's careless or improper operations are deleted.

Next, a generation monitor process (step S14) is performed. More specifically, a diagnosis is conducted to check whether or not the version of the software stored in the client system file 21 of the client unit 2 coincides with the version of the software stored in the backup file 11 of the server unit 1. When there is no coincidence (step S15), an operation environment update process is performed (step S16). This is a process for reinstalling the software stored in the backup file 11 of the server unit 1 into the client system file 21 of the client unit 2 (step S9). By the process, the version of the software stored in the client system file 21 of the client unit 2 coincides with the version of the software stored in the backup file 11 of the server unit 1. In other words, the version of the software stored in the client system file 21 of the client unit 2 coincides with the version of the software stored in the client system files 21 of any other client units 2.

By the series of processes described above, the operation environment of the client unit 2, that is, the hardware, software and firmware of the client unit 2 become normally operational, the version of the software installed in the client unit 2 is created identical to the version installed in any other client units 2, and the self-maintenance process is completed. After this, the software stored in the client system file 21 is started (step S1). Since the client unit 2 is connected to the server unit 1 from then on, the client unit 2 operates as a client unit 2 of a general client/server system.

Figure 4:
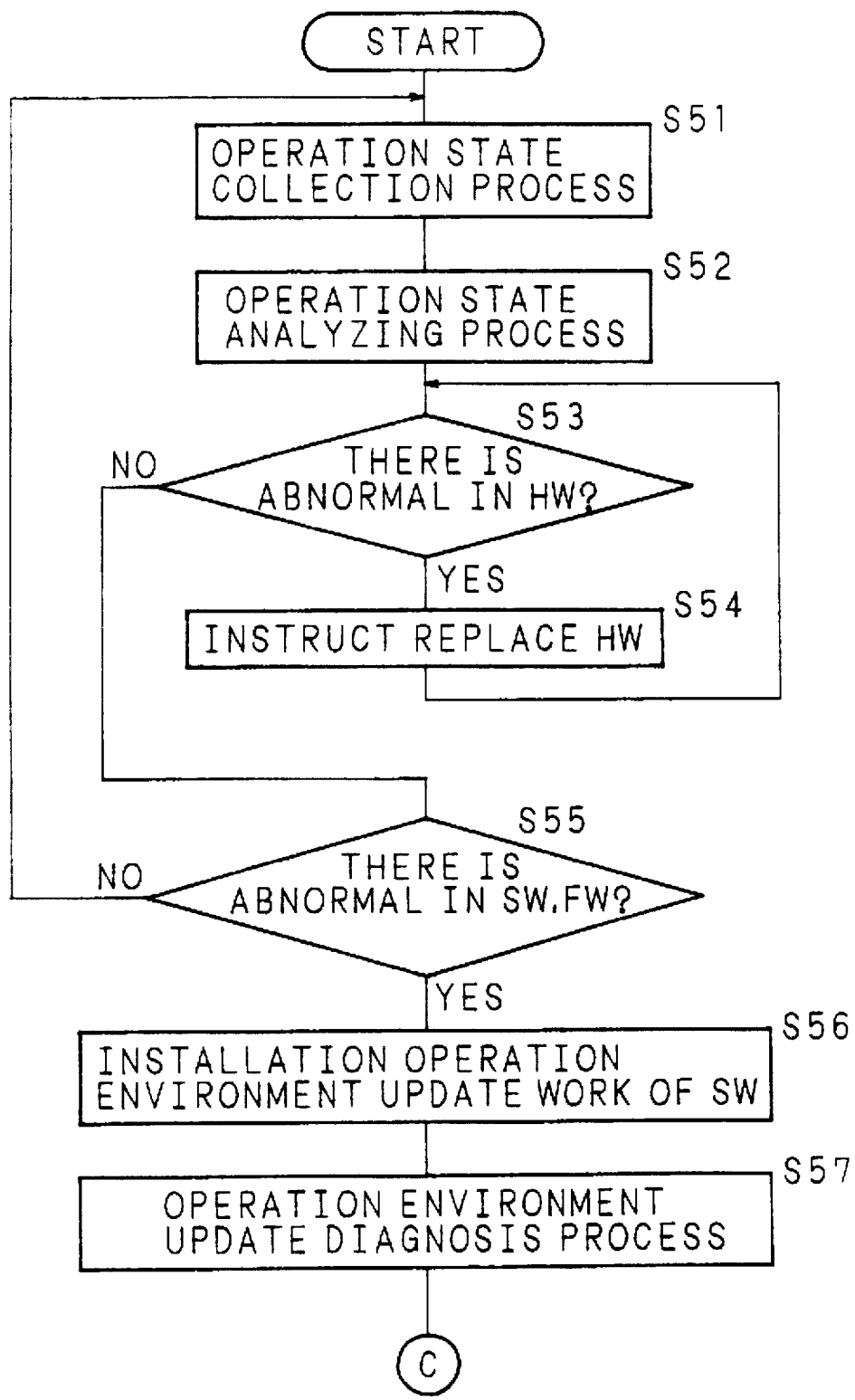
FIG. 4 is a part of a flow chart showing a processing procedure using software for management process by a management unit of the client/server system of the invention.
Figure 5:
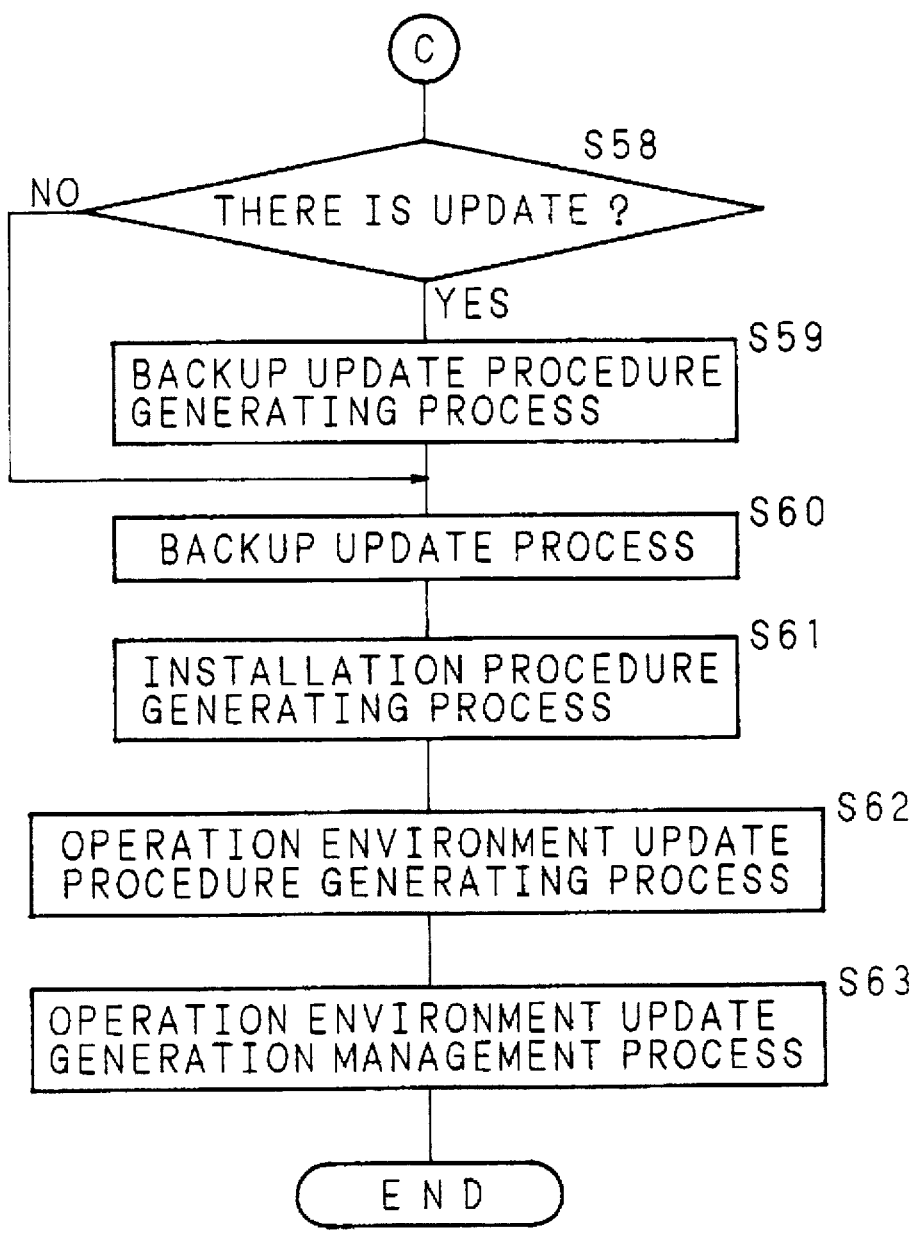
FIG. 5 is another part of the flow chart showing the processing procedure using software for management process by the management unit of the client/server system of the invention.

Next, a procedure of the management process using the management software stored in the management system file 38 of the management unit 3 is described below referring to the flow charts shown in FIG. 4 and FIG. 5.

At first, the management unit S performs an operation state collection process (step SS1). In this process, the management unit 3 collects the contents of the error information file 13 of the server unit 1. Error informations obtained when each client unit 2 performed the above-mentioned self-maintenance has been stored in the error information file 13 of the server unit 1. Next, the management unit 3 performs the operation state analyzing process for each client unit 2 on the basis of the collected data (step S52) to check through diagnosis whether or not any abnormality has occurred in the hardware of each client unit 2 and whether or not any change, such as deletion, creation and modification, has occurred in the software and firmware of each client unit 2.

When an abnormality has occurred in the hardware (HW) of a certain client unit 2 (step S53), for example, the management unit 3 instructs to replace the hardware concerned (step S54). According to the instruction, the user or the maintenance engineer can take necessary actions promptly and accurately.

On the other hand, when any change has occurred in the software (SW) or firmware (FW) in the operation environment of a client unit 2 (step S55), the maintenance engineer judges that it is necessary to improve the software and firmware of all the client units 2 including the client unit 2 in which the change has occurred. The maintenance engineer at first updates the operation environment of the management unit 3 to update the operation environment of each client unit 2. When it is necessary to add new software to each client unit 2, or when a change has occurred in the existing software, an update work is performed (step S56) to update the operation environment by installing the software to be added or changed in the management unit 3. This operation is a preparing operation used to update the operation environment of each client unit 2, which has been stored in the backup file 11 of the server unit 1.

At first, the operation environment update diagnosis process is performed (step S57) and the data stored in the client system file 31 of the management unit 3 is compared with the data stored in the system log file 33 of the same. When there is no coincidence, it is determined that deletion, creation or modification has occurred (step S58). In this case, at first a backup update procedure generating process is performed (step S59). By this process, a procedure for updating the backup file 11 of the server unit 1 is generated, and a backup update process is performed (step S60) by transferring data from the client system file 31 of the management unit 3 to the server unit 1 according to the generated procedure and by deleting unnecessary data from the backup file 11 of the server unit 1 according to the same. The backup file 11 is thus updated actually.

After the backup file 11 of the server unit 1 is updated in this way, a procedure for installing the client system file for the client system files 21 of all of the client units 2 is generated by performing an installation procedure generating process (step S61), and the procedure is sent to the server unit 1. An operation environment update procedure generating process (step S62) and an operation environment update generation management process (step S63) are performed, and the operation environment update procedure and the generation information are registered in the server unit 1. By these processes, all of the client units 2 can obtain a common operation environment (software, firmware, data deletion, etc.). The same operation environment (software and firmware) is offered when the self-maintenance system of each client unit 2 performs the processes at the time of power-on of all of the client units 2 as described above by referring to the operation environment update procedure and the generation information registered in the server unit 1.

By the series of processes described above, the same operation environment (software and firmware) is offered in the client system files 21 of all of the client units 2 when the self-maintenance system performs the processes at need at the time of power-on by referring to the installation procedure, the operation environment update procedure and the generation management information registered in the server unit 1.

FIG. 6 is a table showing the actual results obtained by the trial operation of the client/server system of the invention, conducted by the inventor of the invention. According to this example, in a conventional client/server system, 82 problems occurred in the past five years only when problems having become obvious were counted. When the client/server system of the invention was applied, only one problem occurred in a year. However, this problem was caused by a software bug and was inherently unavoidable by the client/server system of the invention.

As described above, in the client/server system of the invention, each of the plural client units connected to the LAN line performs the above-mentioned self-maintenance process when it is turned on. Accordingly, in the client/server system of the invention, the client units other than the client unit performing the self-maintenance can operate normally. In addition, since the client unit performing the self-maintenance requests only the information required for maintenance to the server unit, the server unit and the LAN line are prevented from being subjected to excessive loads. Still more, the time required for maintenance at each client unit can be shortened.

Furthermore, in the client/server system of the invention, as the maintenance processes are automated, loads to personnel in charge of maintenance can be reduced and the fear of system down is also reduced, thereby improving the economical efficiency and offering benefit to the user.

Additionally, in the client/server system of the invention, each client unit enters the operation state after having been recovered to the normal state by the self-maintenance conducted at the time of start of each client unit. When the client unit is built in a LAN line network, it is connected to the LAN line and set in the operation state first at the time of recovery. Therefore, problems which may affect the entire system, such as improper operation by the user and invasion of computer viruses, can be avoided beforehand.

Moreover, when the upgrade of the software stored in the operation environment (software, firmware, etc.) is performed in one client unit, the same operation environment can also be offered to any other client units by the management unit. The user can therefore use the client in the newest operation environment at each client unit.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A client/server system in which at least one client unit whose software and firmware are installed in a hardware thereof, and at least one server unit having backup data for the software of said client unit are connected with each other, wherein said client unit comprises:

hardware diagnosing means for diagnosing the hardware of said client unit;

system start diagnosing means for, when said hardware diagnosing means has determined that an abnormality has been caused, diagnosing whether the software of said client unit can be started or not, and for releasing said client unit from the system when the software cannot be started;

installation state diagnosing means for, when said system start diagnosing means has determined that the software can be started, diagnosing whether or not the software has been installed in said client unit;

operation environment change diagnosing means for, when said system start diagnosing means has determined that the software can be started, diagnosing whether or not the software and firmware installed in Said client unit have been deleted, created or modified;

generation monitoring means for, when said system start diagnosing means has determined that the software can be started, diagnosing whether or not the generation of the software installed in said client unit is identical to the generation of the software backed up by said server unit;

installing means for, when said installation state diagnosing means has determined that the software has not been installed, installing the software backed up by said server unit into said client unit;

self-repairing means for, when said operation environment change diagnosing means has determined that the software and firmware installed in said client unit have been deleted, created or modified, allowing said client unit to repair itself or for repairing said client unit by reinstalling from the server unit; and operation environment updating means for, when said generation monitoring means has determined that the generation of the software and firmware installed in said client unit is not identical to the generation of the operation environment backed up by said server unit, updating operation environment of said client unit by itself.

2. A client/server system in which at least one client unit whose software and firmware are installed in a hardware thereof, at least one server unit having backup data for the software of said client unit, and a management unit are connected with each other, wherein said client unit comprises self-maintaining means for diagnosing the presence or absence of any deletion, creation or modification in the hardware, software and firmware thereof, said server unit comprises error information keeping means for, when said self-maintaining means of each client unit has determined that any deletion, creation or modification has occurred in the software and firmware of said client unit, keeping the state of a deletion, creation or modification, and said management unit comprises:
- operation state collecting means for collecting the contents of said error information keeping means of said server unit;
- means for, when the software and firmware of said management unit have been updated, loading the software and firmware of said management unit to said server unit as backup data on the basis of the information collected by said operation state collecting means;
- means for generating a procedure for installing backup data from said client unit to said server unit, and for registering said procedure to said server unit on the basis of the information collected by said operation state collecting means; and
- means for generating an operation environment update procedure for updating the software and firmware of said client unit so as to be identical to those of said management unit, and for registering said procedure in said server unit on the basis of the information collected by said operation state collecting means.

3. A client/server system in which at least one client unit whose software and firmware are installed in a hardware thereof, at least one server unit having backup data for the software of said client unit, and a management unit are connected with each other, wherein said client unit comprises self-maintaining means, including:
- hardware diagnosing means for diagnosing the hardware of said client unit;
- system start diagnosing means for, when said hardware diagnosing means has determined that an abnormality has been caused, diagnosing whether the software of said client unit can be started or not, and for releasing said client unit from the system when the software cannot be started;
- installation state diagnosing means for, when said system start diagnosing means has determined that the software can be started, diagnosing whether or not the software has been installed in said client unit;
- operation environment change diagnosing means for, when said system start diagnosing means has determined that the software can be started, diagnosing whether or not the software and firmware installed in said client unit have been deleted, created or modified;
- generation monitoring means for, when said system start diagnosing means has determined that the software can be started, diagnosing whether or not the generation of the software installed in said client unit is identical to the generation of the software backed up by said server unit;
- installing means for, when said installation state diagnosing means has determined that the software has not been installed, installing the software backed up by said server unit into said client unit;
- self-repairing means for, when said operation environment change diagnosing means has determined that the software and firmware installed in said client unit have been deleted, created or modified, allowing said client unit to repair itself or for repairing said client unit by reinstalling from the server unit; and
- operation environment updating means for, when said generation monitoring means has determined that the generation of the software and firmware installed in said client unit is not identical to the generation of the operation environment backed up by said server unit, updating operation environment of said client unit by itself, and said server unit comprises error information keeping means for, when said self-maintaining means of each client unit has determined that any deletion, creation or modification has occurred in the software and firmware of said client unit, keeping the state of a deletion, creation or modification, and said management unit comprises managing means, including:
- operation state collecting means for collecting the contents of said error information keeping means of said server unit;
- means for, when the software and firmware of said management unit have been updated, loading the software and firmware of said management unit to said server unit as backup data on the basis of the information collected by said operation state collecting means;
- means for generating a procedure for installing backup data from said client unit to said server unit, and for registering said procedure to said server unit on the basis of the information collected by said operation state collecting means; and
- means for generating an operation environment update procedure for updating the software and firmware of said client unit so as to be identical to those of said management unit, and for registering said procedure in said server unit on the basis of the information collected by said operation state collecting means.

* * * * *

UNITED STATES PATENT AND TRADEMARK OFFICE
CERTIFICATE OF CORRECTION

PATENT NO. : 5,704,031
DATED : December 30, 1997
INVENTOR(S) : Ichizou MIKAMI, et al.

It is certified that error appears in the above-identified patent and that said Letters Patent is hereby corrected as shown below:

Col. 6, line 4, change "(Step S1)" to --(Step S17)--
line 9, change "38" to --36--
line 11, change "S" to --3--
line 12, change "(Step SS1)" to --(Step S51)--

Signed and Sealed this

Twenty-first Day of April, 1998

Attest:

BRUCE LEHMAN

Attesting Officer                Commissioner of Patents and Trademarks